R. C. CAUGHEY.
CLUTCH MECHANISM.
APPLICATION FILED DEC. 19, 1914.
1,146,135.
Patented July 13, 1915.
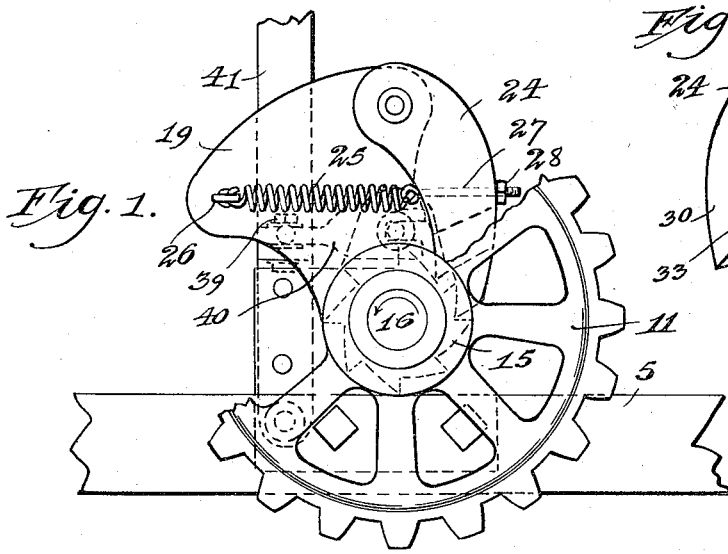
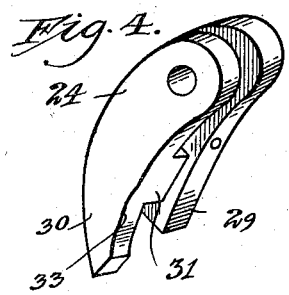
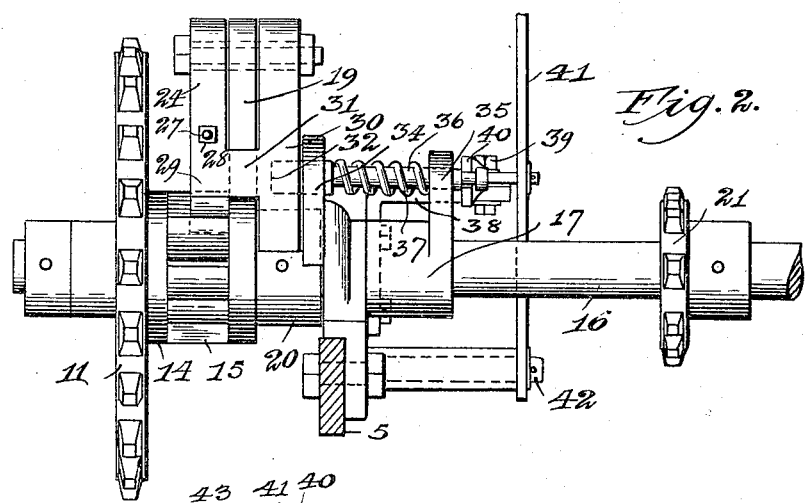
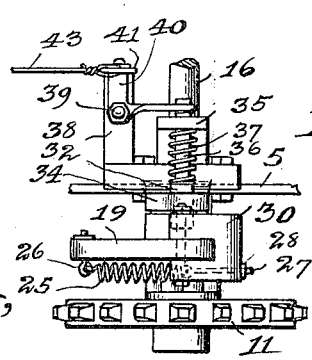
Inventor,
Robert C. Caughey

UNITED STATES PATENT OFFICE.

ROBERT C. CAUGHEY, OF DIXON, ILLINOIS, ASSIGNOR TO GRAND DETOUR PLOW COMPANY, OF DIXON, ILLINOIS, A CORPORATION OF ILLINOIS.

CLUTCH MECHANISM.

1,146,135.  Specification of Letters Patent.  Patented July 13, 1915.

Original application filed May 22, 1914, Serial No. 840,208. Divided and this application filed December 19, 1914. Serial No. 878,044.

*To all whom it may concern:*

Be it known that I, ROBERT C. CAUGHEY, a citizen of the United States, residing at Dixon, in the county of Lee and State of Illinois, have invented certain new and useful Improvements in Clutch Mechanisms, of which the following is a specification.

This invention is a division of my original application Serial No. 840,208, filed May 22, 1914, for improvements in power lift gang plows, and refers to the clutch mechanism employed to effect at will a rotary movement of a shaft driving certain operating parts.

Among the salient objects of the invention are, to provide an improved clutch mechanism for at will effecting engagement between a normally idle part and a normally rotating part whereby the idle part may be caused to rotate through a certain predetermined angle; to provide a construction of the class referred to which shall be exceptionally rugged and substantial in construction, and capable of being manufactured at small cost from inexpensive materials; and, in general, to provide an improved clutch mechanism of the character referred to.

My invention consists of the matters hereinafter referred to, and more particularly pointed out in connection with the accompanying drawings, in which—

Figure 1 is an end elevation of the clutch mechanism; Fig. 2 is a side elevation of Fig. 1; Fig. 3 is a reduced plan of Fig. 1; and Fig. 4 is a perspective view of the pawl member.

The specific clutch mechanism which I have selected to illustrate, is a mechanism employed to effect the rotation of gang plow lifting devices which are operated by means of the movement of the plow as it is pulled over the ground. In the drawings, the lift mechanism is driven initially from one of the wheels of the plow by means of a chain which engages the large sprocket wheel 11. The large sprocket wheel 11 thus revolves continuously while the gang plow is being pulled over the ground. At one side of the sprocket wheel 11 and cast integrally with it, is an extended hub portion 14, the end of which is formed with ratchet teeth 15, and the whole wheel with its hub is adapted to revolve freely upon the jack shaft 16 which is journaled in a suitable bearing 17 fastened to the gang plow frame 5. Interposed between the hub 14 and the bracket 17, and securely pinned or keyed to the jack shaft 16, is a sector-shaped arm 19 provided with a suitable hub 20, and in a suitable position behind the bearing 17 there is also keyed to the jack shaft 16 a small sprocket pinion 21 which drives the lifting mechanism by means of a chain (not shown). The sector arm 19 ordinarily occupies the position shown in the drawings, and at its upper corner carries a pivoted pawl member 24, the upper end of which is forked to embrace the sector arm 19. The lower end of the pawl member is urged toward the ratchet hub 14 by virtue of a coil tension spring 25, one end of which is secured to the sector arm at 26, and the other end to a bolt 27 which passes through the pawl member 24 and is secured by a nut 28.

The pawl member 24 consists of the pawl proper 29 and the cam 30 which are connected by an oblique four-sided web 31. The pawl 29 is adapted to engage the ratchet teeth 15, when permitted to do so, but normally the pawl member 24 is lifted to bring the pawl 29 out of contact with the ratchet teeth 15 by virtue of the pin 32 which engages the cam surface 33 on the under side of the cam 30 and thus lifts the point of the pawl out of the range of the ratchet teeth. The pin 32 is constructed to slide in a pair of bracket arms 34 and 35 projecting from the top of the bearing 17, and the inner end of the pin is reduced in cross-section to form a stem 36 around which is wound a coil compression spring 37 which is interposed between the arm 35 and the shoulder on the pin and thus normally forces the latter longitudinally outward into the range of the cam 30.

Secured to a part of the fixed frame of the gang plow is a small angular bracket 38, at the end of which is a vertical pivot 39 upon which is mounted a bell crank lever 40. One end of the bell crank lever 40 is forked and engages a groove in the projecting end of the stem 36, and the other end of the bell crank is adapted to be engaged by the lever 41 which, at its lower end, is pivoted upon a pin 42 projecting horizontally from a fixed portion of the frame of the machine. The upper end of the lever 41 projects upward a considerable distance and is furnished with a cord 43 leading to the operator in the tractor used for pulling the gang plow.

Describing the operation of the clutch mechanism, it will be seen that, with the parts in position shown, when the cord 43 is pulled, the end of the lever 41 will move forward, the bell crank lever 40 will rotate upon its pivot, the forked end of the bell crank lever will thus pull the pin 32 longitudinally in its bearings, and, the end of the pin having been withdrawn from engagement with the cam 33, the pawl member 22 will be released and the pawl 29 will engage the ratchet teeth 15 in the hub of the sprocket wheel. The ratchet teeth in the hub are so formed as to engage the pawl 29 when the sprocket wheel 11 rotates in the direction of the arrow, shown on the end of the shaft 16 in Fig. 1. Said wheel 11, as before described, rotates continuously while the plow is being pulled ahead. The sprocket wheel is thus clutched to the sector arm 19, which commences to rotate, and with it the shaft 16 and sprocket pinion 21. As soon as the pawl member 24 has dropped into engagement with the ratchet teeth on the hub and commences to rotate the shaft 16, the operator releases his pull on the cord, and the pin 32 is thus urged back into its original position by the spring 37, and just before the sector arm 19 has completed a whole revolution, the cam surface 33 strikes the end of the pin 32 and lifts the part 24 into its original position with the pawl 29, out of the range of the ratchet teeth 15. The rotary movement of the shaft 16, after its single revolution, is thus arrested.

It is apparent that, no matter in what angular position the sprocket wheel 11 may be upon the shaft 16, whenever the clutch pin is withdrawn the pawl will engage the next tooth of the ratchet wheel 15 which happens to arrive in register therewith, thus practically no time is lost until the shaft 16 commences to rotate and operate the lift mechanism. This is of particular importance in the case of plows, so as to avoid having unplowed spaces of greater or less length at the end of each furrow. The construction is such that all the parts may be made by an ordinary foundry or an ordinary blacksmith shop; thus, in case repairs become necessary, there is no delay consequent upon ordering duplicate parts from a long distance. However, I have found that such a clutch mechanism as I have illustrated should rarely need repairing, since the parts are of exceptionally rugged and substantial construction and the working mechanism is at all times completely exposed for inspection.

It is manifest that the structural details of the mechanism shown may be varied considerably without departing from the spirit of the invention. Therefore, I do not wish to be limited as to the scope of my invention, except as specified in the appended claims.

I claim—

1. In a clutch mechanism, the combination of a continuously driven rotating element provided with a cylindrical portion having projections formed in its outer surface, a normally idle rotary element adapted to rotate co-axially with said first element, a relatively stationary frame provided with bearing means for said rotary elements, a lateral projection on said normally idle rotary element, a pawl member pivoted upon said projection and adapted to swing in a plane substantially at right angles to the axis of rotation of said elements and adapted to engage said projections, a spring carried by said normally idle element and adapted to force said pawl into engagement with said projections, and a member normally engaging said pawl and holding same out of operative engagement with said projections and manually shiftable to permit said pawl to operatively engage said projections and provided with means holding said member in engagement with said pawl whereby the latter is normally maintained in inoperative position.

2. In a clutch mechanism, the combination of a constantly rotating wheel provided with a hub having teeth formed in its cylindrical surface, a relatively stationary frame, a normally idle shaft journaled in said frame co-axial with said wheel and provided with a lateral extension, a pawl member adapted to swing in a plane substantially at right angles to the axis of said shaft and pivoted to said lateral projection at a substantial distance from the axis of the shaft and adapted to engage said teeth on said hub, a spring carried by said shaft and adapted to force said pawl into engagement with said teeth, and a member normally engaging said pawl and holding same out of contact with said teeth, manually shiftable to permit said pawl to engage said teeth and provided with means holding it in engagement with said pawl whereby the latter is normally maintained in inoperative position.

3. In a clutch mechanism, the combination of a relatively stationary frame provided with a journal bearing, a normally idle shaft adapted to rotate in said bearing, a constantly driven wheel adapted to rotate upon said shaft and provided with a hub having ratchet teeth formed in its cylindrical portion, a radially projecting arm keyed to said shaft, a pawl member mounted on the outer end of said arm on a pivot spaced apart from and parallel with the axis of said shaft and adapted to swing in a plane at right angles to the axis of said shaft and engage the teeth on said hub, a spring also carried by said arm for forcing the pawl into engagement with said teeth, said pawl member having a cam surface thereon, a pin mounted to slide parallel with the axis of said shaft and spaced apart therefrom and adapted to engage said cam surface and force said pawl out of engagement with said teeth, means for manually withdrawing said pin from out of engagement with said cam surface, and automatic means for returning said pin to its normal position.

ROBERT C. CAUGHEY.

Witnesses:
A. W. LELAND,
GERTRUDE CASTLES.

Copies of this patent may be obtained for five cents each, by addressing the "Commissioner of Patents, Washington, D. C."